(12) United States Patent
Tanaka

(10) Patent No.: US 11,327,481 B2
(45) Date of Patent: May 10, 2022

(54) COMMUNICATION SYSTEM, TRANSMITTER, RECEIVER, AND COMMUNICATION METHOD

(71) Applicant: Futaba Corporation, Mobara (JP)

(72) Inventor: Masahiro Tanaka, Mobara (JP)

(73) Assignee: Futaba Corporation, Mobara (JP)

( * ) Notice: Subject to any disclaimer, the term of this patent is extended or adjusted under 35 U.S.C. 154(b) by 47 days.

(21) Appl. No.: 16/874,978

(22) Filed: May 15, 2020

(65) Prior Publication Data

US 2020/0278672 A1 Sep. 3, 2020

Related U.S. Application Data

(62) Division of application No. 15/486,913, filed on Apr. 13, 2017, now Pat. No. 10,691,120.

(30) Foreign Application Priority Data

Apr. 27, 2016 (JP) .................................. 2016-089216

(51) Int. Cl.
*G05D 1/00* (2006.01)
*G08C 17/02* (2006.01)
*H04Q 9/00* (2006.01)
*G05B 19/042* (2006.01)

(52) U.S. Cl.
CPC ......... *G05D 1/0016* (2013.01); *G05B 19/042* (2013.01); *G05B 19/0425* (2013.01); *G05D 1/0022* (2013.01); *G08C 17/02* (2013.01); *H04Q 9/00* (2013.01); *G05B 2219/23297* (2013.01); *G05B 2219/2603* (2013.01)

(58) Field of Classification Search
None
See application file for complete search history.

(56) References Cited

U.S. PATENT DOCUMENTS

| | | |
|---|---|---|
| 6,636,550 B1 | 10/2003 | Horikoshi et al. |
| 2008/0101369 A1 | 5/2008 | Sandoz et al. |
| 2011/0228866 A1 | 9/2011 | Nagai et al. |
| 2013/0138266 A1 | 5/2013 | Koike et al. |

FOREIGN PATENT DOCUMENTS

| | | |
|---|---|---|
| JP | 2008193707 A | 8/2008 |
| JP | 2014230715 A | 12/2014 |
| WO | 2004114561 A1 | 12/2004 |

OTHER PUBLICATIONS

Japan Patent Office, Notification of Reasons for Refusal, Application No. 2016-089216, dated Aug. 23, 2018, 5 pages.

*Primary Examiner* — David P. Merlino
(74) *Attorney, Agent, or Firm* — Quarles & Brady LLP

(57) ABSTRACT

This communication system has a transmitter and a receiver for repeatedly transmitting a frame of steering signal having a plurality of channels. The transmitter stores an identification data of a control parameter of a specific operation object in a first empty channel within one frame and stores a characteristic data of the control parameter of the specific operation object in a second empty channel to transmit along with steering data of other channels. Since the identification data and the characteristic data are transmitted at the same time along with the control data, the control parameters can be changed during steering of the operation object. Since the characteristic data and the identification data are transmitted in the same frame as a pair, when at least the one frame is received, the setting of the control parameter can be changed.

1 Claim, 4 Drawing Sheets

COMMUNICATION SYSTEM, TRANSMITTER, RECEIVER, AND COMMUNICATION METHOD

CROSS-REFERENCE TO RELATED APPLICATIONS

This application is a divisional application of U.S. patent application Ser. No. 15/486,913 filed on Apr. 13, 2017, which claims the priority benefit of Japanese Patent Application No. 2016-089216 filed on Apr. 27, 2016, which is fully incorporated herein by reference.

BACKGROUND OF THE INVENTION

Field of the Invention

The present invention relates to a communication system for controlling a body to be steered remotely such as a moving body like a helicopter, an airplane, an automobile, a ship, or an industrial machine operated unattendedly, a transmission and receiver used therefor, and a communication method in such communication system and the like, and more particularly to a communication method in which a control parameter that defines a control characteristic of an operation object mounted on a body to be steered is reliably changed while continuing steering.

Description of the Related Art

The receiver of a model transceiver system disclosed in the following patent document 1 receives a signal corresponding to an operation amount of a plurality of operators sent from a transmitter for each channel, and is provided with a first digital terminal from which the received signal is output in serial control data format, a second digital terminal connected to the first terminal, a servo controlled by PWM based on a signal input to the second digital terminal, and a drive unit for generating a drive control signal for a device to be operated such as a motor. The first digital terminal and the second digital terminal are connected by a single digital communication line, and a control data of each channel is serially arranged and is communicated with this digital communication line. According to this invention, only one operation signal communication line is sufficient, and a value of an arbitrary parameter is said to be changeable in real time without turning off the power supply.

SUMMARY OF THE INVENTION

Technical Problem

In the model transceiver system disclosed in Patent Document 1, data (parameter) relating to characteristics are sequentially transmitted in time division over a plurality of frames. That is, on the transmitting side, a header indicating the characteristic data is sent in the first frame, data indicating a value of the characteristic data is sent in the next frame, the receiving side sequentially receives them and buffers a certain amount of data (see paragraph 0039 or the like of the Patent Document 1). Generally, in the model transceiver system, an allowable predetermined size is allocated to the pulse width of the control signal for controlling a normal servo. However, as described above, when data of a certain parameter is to be transmitted in a different frame, in order to distinguish the header from the data, it is necessary to assign a size different from the allowable size set for the servo to the data of these parameters, causing a problem in affinity with the conventional system, thereby posing a problem that the header and the data concerning the parameter may not be recognized correctly.

Also, unless two frames of a frame including a header and a frame including data are properly received consecutively with such a method, it is not possible to acquire parameters. In the case where 2.4 GHz band radio waves are used, in an environment where a plurality of radio waves simultaneously emits like a model car race, the possibility that the frequencies of the transmission radio waves overlap becomes high, and it is sufficiently conceivable that two frames of the header and data cannot be properly received consecutively.

The present invention has been made to solve the above-described problems of the related art, and it is an object of the present invention to reliably change a control parameter that stipulates the steering characteristics of an operation object mounted on a body to be steered while continuing steering.

Solution to Problem

A communication system according to a first aspect, includes: a transmitter provided corresponding to a plurality of operation objects mounted on a body to be steered, and repeatedly transmitting one frame of a steering signal having a plurality of channels, each of the channels having a corresponding control data of the operation object stored therein; and a receiver connected to the operation object and receiving the steering signal, wherein at the transmitter, an identification data of a control parameter of the specific operation object in the one frame of the steering signal is stored in a first empty channel not allocated to the specific operation object, a characteristic data of the control parameter of the specific operation object is stored in a second empty channel not allocated to the specific operation object, and the steering signal is transmitted.

A transmitter according to a second aspect of the present invention is provided corresponding to a plurality of operation objects mounted on a body to be steered and repeatedly transmits one frame of a steering signal having a plurality of channels, each of channels having a corresponding control data of the operation object stored therein, wherein an identification data of a control parameter of the specific operation object in the one frame of the steering signal is stored in a first empty channel not allocated to the specific operation object, and wherein a characteristic data of the control parameter of the specific operation object is stored in a second empty channel not allocated to the specific operation object, and the steering signal is transmitted.

A receiver according to a third aspect of the present invention is provided corresponding to a plurality of operation objects mounted on a body to be steered, and repeatedly receiving one frame of a steering signal having a plurality of channels, each of channels having a corresponding control data of the operation object stored therein, wherein upon receiving the one frame of the steering signal, the specific operation object is designated according to an identification data of a control parameter of the specific operation object stored in a first empty channel not allocated to the specific operation object, and wherein the control parameter of the specific operation object is rewritten according to a characteristic data of the control parameter of the specific operation object stored in a second empty channel not allocated to the specific operation object.

A method according to a fourth aspect of the present invention is the one using a transmitter provided corresponding to a plurality of operation objects mounted on an body to be steered and repeatedly transmitting one frame of a steering signal having a plurality of channels, each of channels having a corresponding control data of the operation object stored therein, and a receiver connected to the operation object and receiving the steering signal, the method including: the transmitter storing an identification data of a control parameter of the specific operation object in the one frame of the steering signal in a first empty channel not allocated to the specific operation object, and storing the characteristic data of the control parameter of the specific operation object in a second empty channel not allocated to the specific operation object; and when receiving the one frame of the steering signal, the receiver designating the specific operation object according to the identification data stored in the first empty channel and rewrites the control parameter of the specific operation object according to the characteristic data stored in the second empty channel.

Advantages of the Invention

According to the present invention, at least two empty channels included in one frame of the steering signal are used, one of which stores the discrimination data of the control parameter of the specific operation object, and the other of which stores the characteristic data of the parameter, and one frame of the steering signal is transmitted simultaneously with a steering data. For this reason, firstly, the identification data and the characteristic data of the control parameter are transmitted simultaneously with the steering data, so that setting of the control parameter can be changed, so as to change the steering characteristic during steering of the body to be steered. Next, since the characteristic data of the control parameter and the identification data are paired and transmitted in one frame of the steering signal, if at least one frame of the steering signal is received, it is possible to change the setting of the control parameter contained in the received steering signal, there is no disadvantage that it is not possible to change the setting of parameters unless the plurality of frames are consecutively received, and even in an environment where there are the plurality of transmitted radio waves in which frequency bands overlap each other, the control parameters of the device of the body to be steered can reliably be changed.

DESCRIPTION OF EMBODIMENTS

Figure 1:
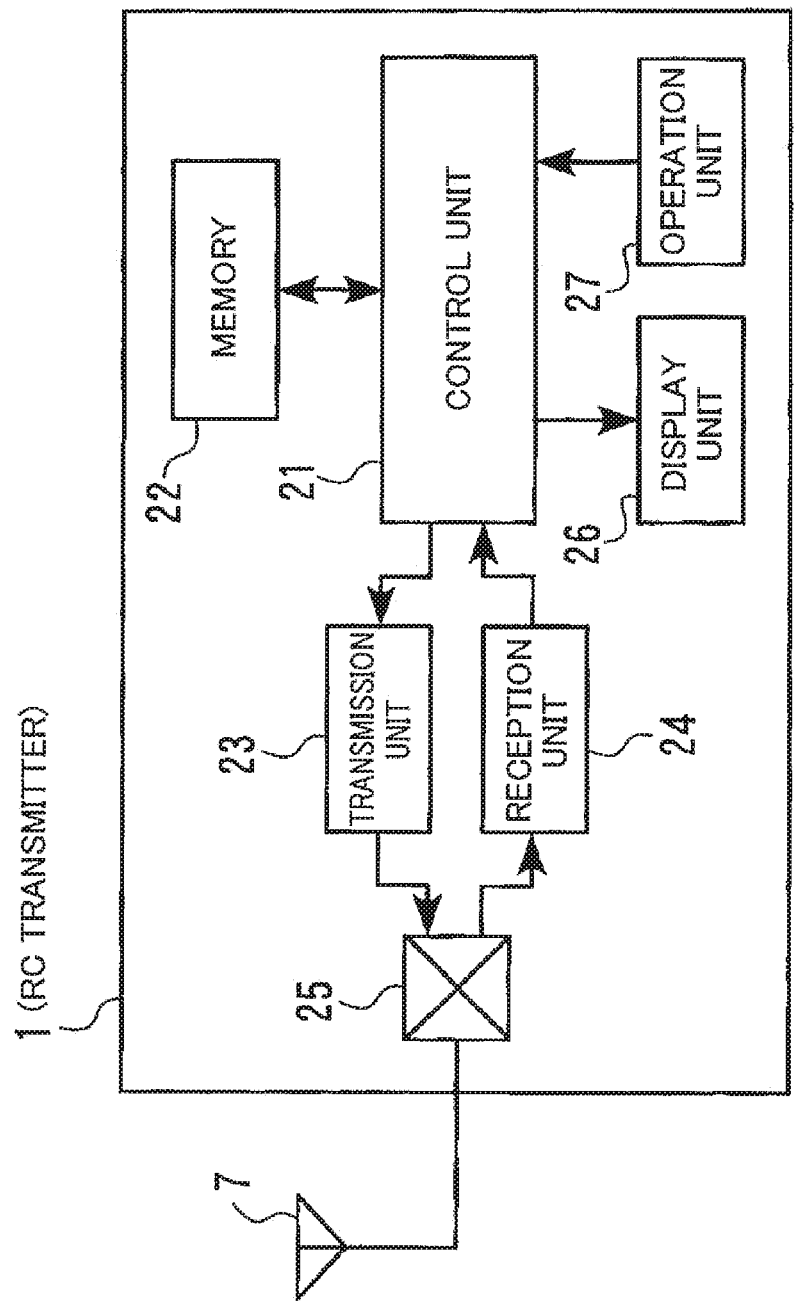
FIG. 1 is a functional block diagram of a transmitter according to a first embodiment.

A communication system according to a first embodiment of the present invention will be described with reference to FIGS. 1 to 3. FIG. 1 shows an example of a system configuration of a radio control transmitter 1 (hereinafter referred to as a transmitter 1) of the present embodiment. The transmitter 1 shown in this figure has a control unit 21, a memory 22, a transmission unit 23, a reception unit 24, a combining/distribution unit 25, a display unit 26, and an operation unit 27.

The control unit 21 is made up of, for example, a CPU, a RAM and the like, and executes required control processing in the transmitter 1 according to a program stored in the memory 22. The memory 22 in this case indicates, for example, a part corresponding to the auxiliary storage device for the control unit 21, and in addition to the above-mentioned program, various setting data and the like are stored.

According to the control of the control unit 21, the transmission unit 23 modulates the data to be transmitted according to a predetermined communication method to be described later, and outputs the modulated data to the combining/distributing unit 25 as a steering signal. The steering signal includes steering data to be transmitted to an body to be steered 10 (shown in FIG. 3), but as will be described later, in the transmitter 1 of the present embodiment, the specified operation object arbitrarily designated by the operator, that is, the control parameter of the specific device can be arbitrarily changed, and data for changing the parameter setting can also be included in the steering signal and is transmitted. It is to be noted that herein, by the operation object or device is meant the device that is mounted on the body to be steered and can receive the signal sent from the outside to control the body to be steered, in particular, can change and set parameters which are data set for the purpose of adjusting, changing, setting or the like the control function. Also, the specific operation object arbitrarily designated by the operator to set/change parameters, etc. is referred to as "specific operation object." Specific examples of the operation object or the specific operation object will be described later.

The combining/distributing unit 25 outputs the steering signal input from the transmitting unit 23 to the antenna 7 side. As a result, the steering signal corresponding to the predetermined communication method is transmitted from the antenna 7 as a radio wave.

A signal received as a radio wave by the antenna 7 is input to the combining/distributing unit 25. The combining/distributing unit 25 outputs the signal input from the antenna 7 to the receiving unit 24.

The receiving unit 24 executes required demodulation processing on the input received signal, extracts a received data, and passes it to the control unit 21. The control unit 21 executes required processing on the received data received.

The display unit 26 is composed of a predetermined display device and is driven in accordance with the display control of the control unit 21, whereby it is possible to display data necessary for controlling the body to be steered timely. Further, in the transmitter 1 of the present embodiment, because the setting can be changed for the control parameter of the specific operation object arbitrarily designated by the operator, it is possible to designate a setting change item on the display unit 26 and to input a desired setting value when such setting change is made.

The operation unit 27 is to collectively show various operators such as a stick, a lever, a button, etc., which are provided in the transmitter 1. When an operation is performed with respect to an operating member forming the operation unit 27, the steering signal corresponding to the operation is input to the control unit 21. The control unit 21 appropriately executes the required processing according to the input steering signal.

Figure 2:
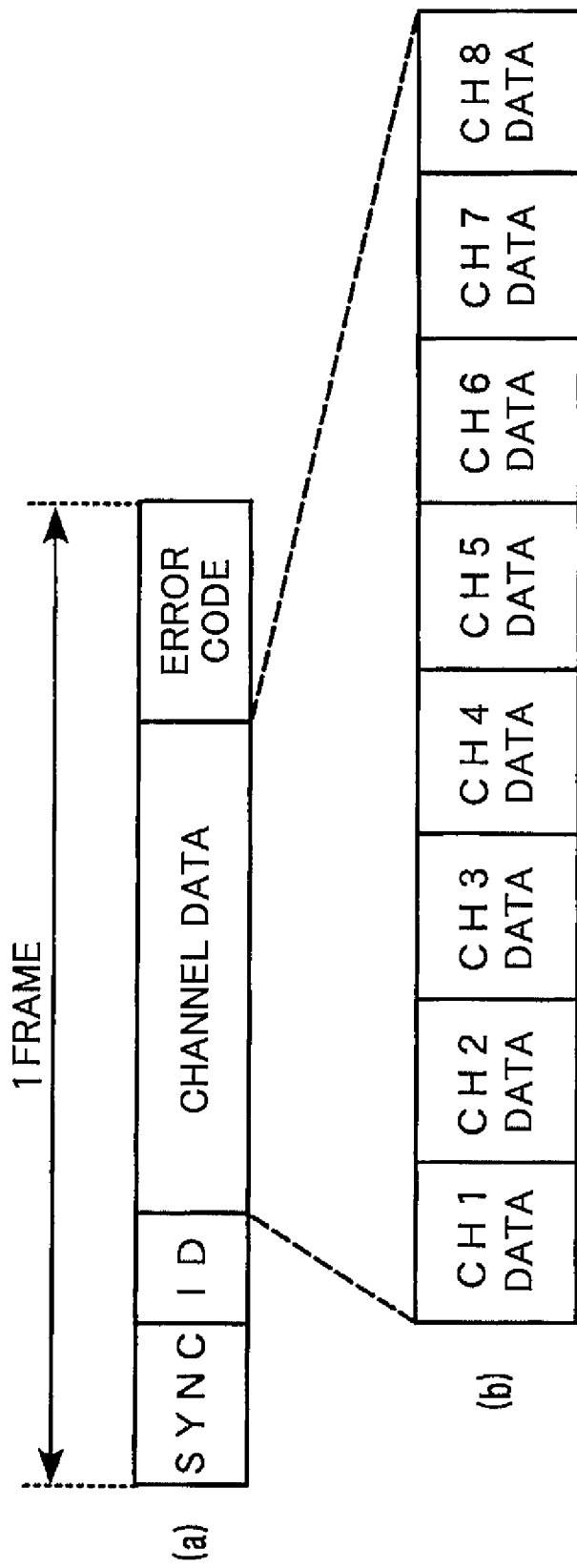
FIG. 2 is a diagram showing an example of a data structure of a steering signal in the first embodiment.

FIG. 2 shows an example of a data structure of the steering signal which is a digital signal transmitted by the transmitter 1 of the present embodiment. FIG. 2 schematically shows the structure of one frame of the steering signal. In the present embodiment, the transmitter 1 repeatedly transmits the data for one frame as the steering signal. The data of the steering signal has the transmitter ID, the channel data, and the error code in order, following the leading SYNC (sync code).

SYNC is to be a synchronization code in the data of the steering signal of this frame unit and is made up of a predetermined bit pattern with a predetermined number of bits. In the transmitter ID, an ID (identifier) attached to the transmitter 1 that transmits the steering signal is stored according to the predetermined number of bits.

In the channel data, data of the control amount (control data) for each channel is stored. Here, by the channel is not meant a division of a different frequency band, but generally in the technical field of radio communication meant different operation objects to be controlled that is the operation object of the body to be steered, as well as the slot corresponding to each operation object in the steering signal or the individual data stored in the slot, and the same also applies to this specification. Therefore, when a plurality of slots is provided in one frame of the steering signal, a part of the slots is allocated to the channels in the order of the numbers, and the control data of the corresponding operation object is stored.

For example, as shown in FIG. 2, assuming that the maximum number of channels that can be handled by the transmitter 1 is eight, the channel data includes individual channel data of CH 1 to CH 8 sequentially arranged as shown in FIG. 2. Each of these individual channel data has the same fixed-length bit number, and the control value or the like is indicated by the bit value.

The error code is added, for example, for error detection and error correction on channel data.

According to the transmitter 1, when the operation unit 27 (for example, a stick) is operated and the steering signal is input to the control unit 21, the control unit 21 calculates control data corresponding to the steering signal. Then, the control unit 21 stores this control data in the corresponding channel of the steering signal and transmits it from the antenna 7. This control operation is repeatedly performed at a predetermined cycle.

In addition, according to the transmitter 1, in the case where there are two or more channels unattended to specific operation objects in the one-frame steering signal, it is possible to perform the operation of changing the setting of the control parameter of the specific operation object desired by the operator while continuing the steering. That is, the operator can operate the operation unit 27 while viewing the display on the display unit 26, designate a specific parameter (type) of a specific operation object, and input the set value (value). As a result, identification data (type of control parameter) of an arbitrary control parameter of the specific operation object is stored in the first empty channel, and characteristic data (value of the control parameter) of the control parameter of the specific operation object is stored in the second empty channel. Then, the control unit 21 transmits, in one frame of the steering signal, the identification data and the characteristic data of these control parameters simultaneously with the steering data.

As described above, in the transmitter 1 of the first embodiment, the identification data and the characteristic data of the control parameter are transmitted in one frame of the steering signal simultaneously with the steering data of the other channels, so that during the steering of the body to be steered 10 the control parameter can be set and changed, and the control characteristics can be changed. In addition, since the characteristic data and the identification data of the control parameter are paired and transmitted in pairs in one frame of the steering signal, it is possible to change the setting of the control parameter included in the received steering signal if at least one frame of the steering signal is received. In the case of transmitting the identification data and the characteristic data in separate frames, it is not possible to change the setting of the parameters unless all of the frames are successively received, but in the present embodiment there is no such inconvenience and it is possible to reliably change the characteristics of arbitrary control parameters of arbitrary devices of the body to be steered even in environments where frequency bands overlap each other and a plurality of transmissions radio waves is mixed.

Figure 3:
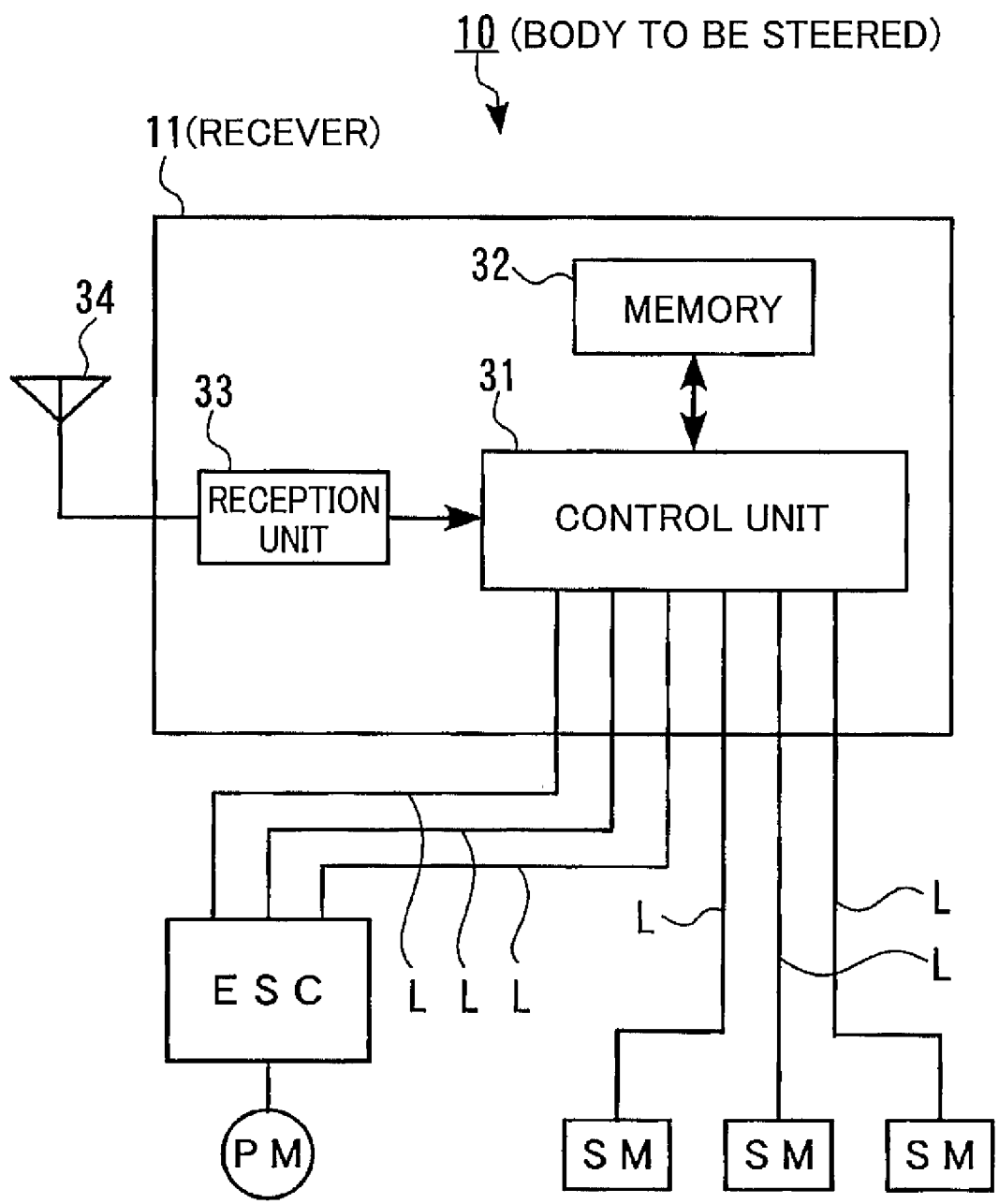
FIG. 3 is a functional block diagram of a receiver and an operation object in the first embodiment.

FIG. 3 shows an example of the system configuration of the receiver 11 of the body to be steered 10. The receiver 11 shown in this figure has a control unit 31, a memory 32, a receiving unit 33, and an antenna 34. A plurality of (three in the illustrated example) servo motors SM is connected to the control unit 31 via a single control line L, and is driven by receiving the operation data from the control unit 31, respectively. In addition, an ESC (electric speed controller) as the operation object is connected to the control unit 31 with three control lines L, and a power motor PM is connected to this ESC. The power motor PM does not include a control device and storage means, and cannot change the setting by itself. Although details will be described later, it is the control parameter of the ESC that receives the setting change by the signal from the control unit 31. For example, if the body to be steered 10 of the embodiment is a model car, the servomotor SM is driving means for operating the wheel drive system etc., and the ESC is provided as speed control means for controlling the power motor PM.

As control parameters that can be changed in the ESC, there are, for example, a forward boost for setting the rising characteristic on the forward side from the neutral, a current limiter for setting the output current limit value, a brake MAX duty for setting a brake strength between the neutral and the maximum brake point, a neutral brake for setting the neutral brake amount, and the like.

The control unit 31 includes, for example, a CPU and the like, and executes required control processing according to a program stored in the memory 32. In addition, the memory 32 in this case is, for example, a part corresponding to an auxiliary storage device for the control unit 31, and in addition to the above-described program, various setting data and the like are stored.

Radio waves of the steering signal transmitted from the transmitter 1 are received by the antenna 34. The receiving unit 33 demodulates the received steering signal and obtains steering data which is a PWM signal for each channel, that is, for each operation object. Based on the steering data for each channel, the control unit 31 controls the operation for each operation object such as servo or ESC. As a result, the body to be steered 10 performs an operation corresponding to the steering operation performed on the transmitter 1.

As the setting of the control parameter of the specific operation object is changed in the transmitter 1, the control unit 31 performs the following control if the identification data and the characteristic data of the control parameter of the specific operation object are included in the steering signal received by the receiver 11. That is, the control unit 31 performs appropriate processing after demodulating the digital steering signal received by the receiving unit 33, and transmits the identification data and the characteristic data included in two of the first and second channels of the control parameter are extracted, and give them to the ESC as the PWM signal. As described above, the number of control lines L connecting the control unit 31 and the ESC is three, and the identification data and the characteristic data are given to the ESC via two of them, and the setting of the control parameter is changed. In addition, the control data of the power motor PM is given through the remaining one control line L.

As described above, according to the communication system of the present embodiment, since the identification data and the characteristic data of the control parameter are transmitted and received simultaneously with the steering data in one frame of the steering signal, during the steering of the body to be steered the control parameters can be set and changed and the control characteristics can be changed. In addition, since the characteristic data of the control parameter and the identification data are transmitted and received in one frame of the steering signal as a pair, if at least one frame of the steering signal is received, the setting of the control parameter contained in the received steering signal can be changed. The inconvenience caused by the conventional communication system in which the setting of the parameters cannot be changed unless a plurality of frames are continuously received can be solved and even in a disadvantageous environment where the frequency bands overlap each other, parameters can be reliably changed.

According to the connection configuration of the receiver 11 and the servo etc. in the body to be steered 11 in FIG. 3, the servo motor SM directly connected to the control unit 31 of the receiver 11 is configured such that the setting of the control parameter cannot be changed in this configuration. However, some of the servo motors SM can be changed in setting, and if the servo motor SM shown in FIG. 3 is a type of servomotor SM capable of changing setting of control parameters as shown in ESC in FIG. 3, it is possible to change the setting of the parameter by appropriately connecting the control unit 31 and each servo motor SM with three control lines L respectively.

Figure 4:
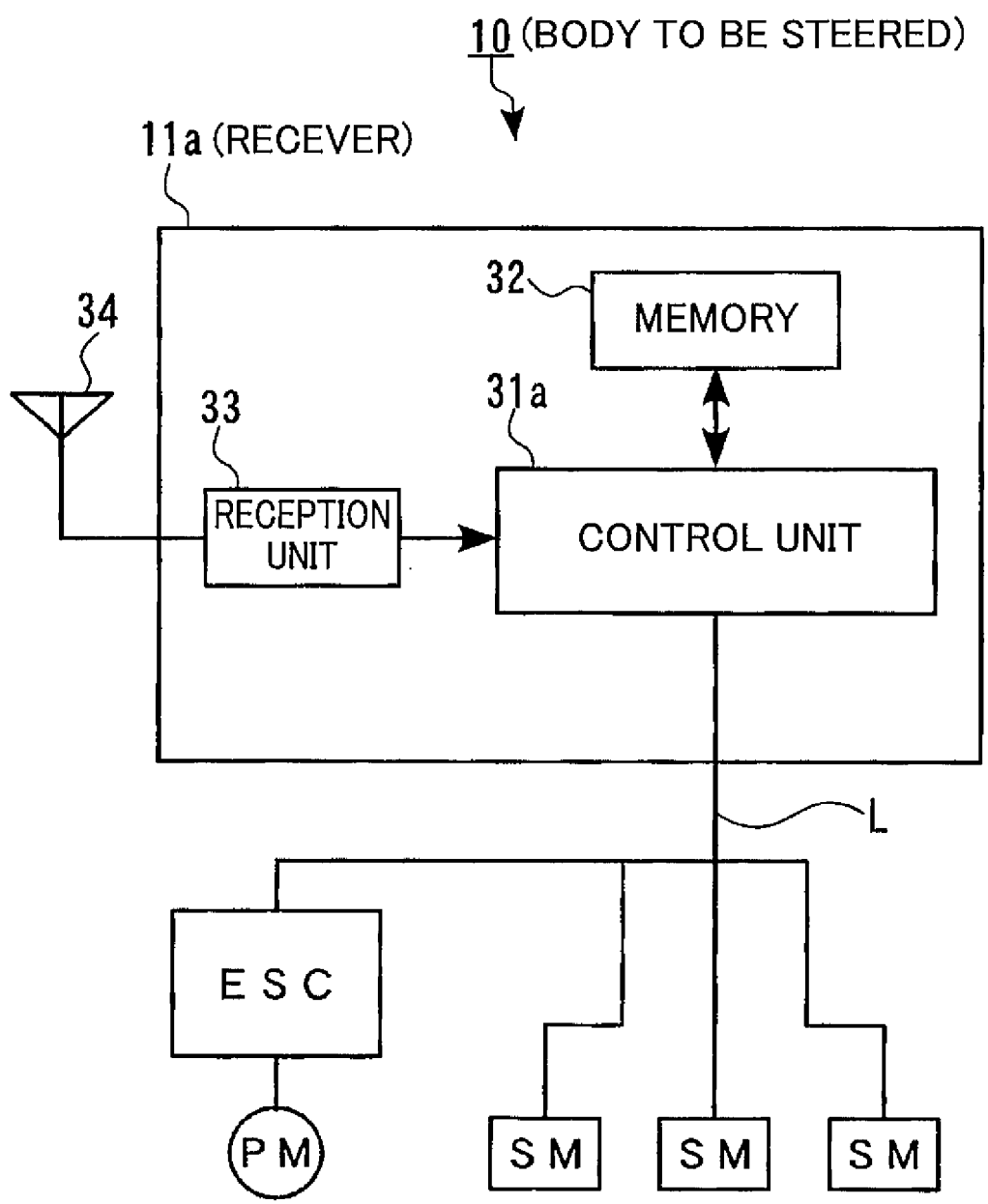
FIG. 4 is a functional block diagram of a receiver and an operation object in a second embodiment.

The communication system according to a second embodiment of the present invention will be described with reference to FIG. 4. FIG. 4 shows a configuration example of the body to be steered 10 side in the communication system of the second embodiment. The configuration of the transmitter side is basically the same as that of the first embodiment. The configuration of the receiver 11a shown in this figure is basically the same as that of the receiver 11 of the first embodiment shown in FIG. 3, but there is difference in the signal processing of the controller 31a and the connection configuration of the receiver 11a and the servo etc. Hereinafter, differences from the first embodiment will be mainly described.

As shown in FIG. 4, a single control line L is led out from the control unit 31a, and this control line L branches into four and includes a plurality (three in the illustrated example) of servo motors SM and is connected to an ESC (electric speed controller) as an operation object. As with the first embodiment, one power motor PM is connected to this ESC.

The control unit 31a of the receiver 11a performs appropriate processing after demodulating the digital steering signal received by the reception unit 33 and directly outputs the serial signal of the same form as that of FIG. 2 from the control line L to each operation object.

Each of the servomotors SM and ESC selects and uses only the data of the channel corresponding to itself from among the serial signals sent from the control unit 31a according to the control means and storage means respectively provided by the servomotors SM and ESC so as to control the operation.

As operation for changing the setting of the control parameter of the specific operation object is performed in the transmitter 1, when the specific operation object is the ESC, ESC selects among the serial signal transmitted from the control unit 31a and uses data of two channels corresponding to the type and value of the control parameter. This is because, as described above, the setting of the power motor PM cannot be changed by itself. According to the present embodiment, the same effect as in the first embodiment can be obtained.

In the communication system according to each of the above-described embodiments, unidirectional communication is established between the transmitter 1 and the receivers 11, 11a, and it is not possible for the transmitter 1 side to recognize that the receivers 11, 11a have received the steering signal. Therefore, for the sake of safety, the transmitter 1 repeatedly transmits the values of all the control parameters that have been set, during operation, to the body to be steered 10 in a predetermined order. However, as described in the respective embodiments, when the setting of the control parameter is changed for the specific operation object, data of the type and value of the changed control parameter is supposed to be immediately placed on the steering signal regardless of the order to transmit.

In the communication systems according to the embodiments described above, there may be a case where the identification data and the characteristic data of the control parameter whose setting is to be changed do not reach the receivers 11, 11a of the body to be steered 10 due to some circumstances. Depending on the situation and the like, it is generally considered that changing the setting of the control parameter during the steer is a case where a change has occurred in the steering environment, etc. and in such a case, it is not preferable that the necessary setting cannot be changed. Therefore, the communication system of each embodiment has a fail-safe function as described below. That is, when the control unit 31, 31a fails to properly receive the steering signal, namely, when the control unit 31, 31a judges that the reception error has occurred, the characteristic data of all the control parameters is reset to the preset value regardless of whether or not the data associated with the setting change of the control parameter is included in the steering signal.

Note that various criteria can be set for criteria for judging reception errors, and reception errors can be taken when the steering signals cannot be received for the predetermined number of consecutive frames, or in the case of intermittent reception failure, the reception error may be made only when the certain number (or a fixed ratio) of frames cannot be received during a predetermined period. In addition, it is preferable that the characteristic data of the control parameter to be re-set in accordance with the reception error is generally controlled such that the control of the body to be steered 10 is stabilized as much as possible, for example, it is also conceivable to be made into the neutral position within a range settable.

As described above, according to the communication system of each embodiment, it is possible to change desired control parameters for a given operation object to desired settings during steering of the object to be operated 10, and furthermore, since the type and the value of the control parameter can be changed at the same time in one frame of the steering signal, there is low possibility not to change even if there is a problem in the radio wave environment, etc. Furthermore, since the value of the parameter is set to a predetermined value so as to stabilize the steering operation, the safety in steering the body to be steered 10 is secured at a high level even though the steering signal cannot be received.

Note that, in each of the above-described embodiments, while the ESC is exemplified as the specific operation object, it is also possible to change the setting of the control parameters of the servo motor SM by connecting the necessary number of control lines L as described above. Examples of control parameters that can be changed in this case include a boost amount for setting the minimum operation amount to be applied to the internal motor when driving the servo, a damping gain for setting the characteristics when the servo is stopped, a stretcher gain for setting characteristics, and smoother which is a function for smoothing the movement of the servo.

In addition, when the specific operation object to be changed in parameter setting is a gyroscope used for a model airplane or the like, as a control parameter that can be changed in setting, for example, a control response for setting a delay of ladder operation, AVCS response to adjust the response speed tail operation, pirouette feeling to select operation feeling during ladder operation, EXP to perform operation feeling setting near the neutral of the ladder stick, gain to set AVCS sensitivity, D gain to set the differential action of the gyro, and D damping for setting the duration of the gyro differential operation.

DESCRIPTION OF SYMBOLS 1 transmitter (radio control (RC) transmitter)
10 body to be steered
11 receiver
21, 31 control unit
27 operation unit
ESC . . . electric speed controller as operation object or specific operation object
SM . . . servo motor
PM . . . power motor

What is claimed is:

1. A receiver receiving one frame of a steering signal having a plurality of channels, wherein the plurality of channels is provided corresponding to a plurality of operating objects mounted on a body to be steered, wherein a control data for each of the plurality of operation objects is stored in a corresponding channel, and wherein upon receiving the one frame of the steering signal, a specific operation object is designated according to an identification data of a control parameter of the specific operation object stored in a first empty channel not allocated to the specific operation object, and wherein the control parameter of the specific operation object is rewritten according to a characteristic data of the control parameter of the specific operation object stored in a second empty channel not allocated to the specific operation object.

* * * * *